(12) United States Patent
Woodford et al.

(10) Patent No.: US 7,571,751 B2
(45) Date of Patent: Aug. 11, 2009

(54) OPTIMIZED BOARD EDGER AND METHOD OF OPERATION THEREOF

(75) Inventors: James D. Woodford, Burtts Corner (CA); Joe Weirathmueller, Fredericton (CA); Friedrich Weirathmueller, Nackawic (CA); Khalil G. Asal, Fredericton (CA)

(73) Assignee: U.S. Natural Resources, Inc., Woodland, WA (US)

( * ) Notice: Subject to any disclaimer, the term of this patent is extended or adjusted under 35 U.S.C. 154(b) by 289 days.

(21) Appl. No.: 11/012,217

(22) Filed: Dec. 16, 2004

(65) Prior Publication Data

US 2005/0109423 A1 May 26, 2005

Related U.S. Application Data

(62) Division of application No. 10/198,113, filed on Jul. 19, 2002, now Pat. No. 6,929,043.

(30) Foreign Application Priority Data

Jul. 24, 2001 (CA) .................................... 2353704

(51) Int. Cl.
*B23Q 15/12* (2006.01)
*B23Q 15/00* (2006.01)

(52) U.S. Cl. .......................... 144/404; 144/2.1; 144/1.1

(58) Field of Classification Search ................. 144/356, 144/357, 359, 363, 376, 378, 391–394, 397, 144/404, 407, 1.1, 2.1, 3.1; 83/72, 360, 368, 83/425, 425.2–425.4, 426

See application file for complete search history.

(56) References Cited

U.S. PATENT DOCUMENTS 702,592 A 6/1902 Roe (Continued)

FOREIGN PATENT DOCUMENTS

CA 567994 12/1958

(Continued)

OTHER PUBLICATIONS

Integrated Motion Controller Manual Curve Sawing Gang System, Version 1.2, dated Nov. 5, 1997., published by CAE Newnes Ltd.

(Continued)

*Primary Examiner*—Shelley Self
(74) *Attorney, Agent, or Firm*—Schwabe, Williamson & Wyatt, P.C.

(57) ABSTRACT

In a first aspect of the invention, there is provided a new method for edging a wood board. This method comprises the steps of constructing from the scanned images of a wood board, a virtual entity of the wood board; determining from the scanned images an optimized cut line along the virtual entity; displacing the forward edge of the virtual entity ahead of the leading edge of the wood board; displacing the rear edge of the virtual entity behind the trailing edge of the wood board and sawing the wood board along the optimized cut line on the virtual entity. In another feature, the saw blades inside the board edger are mounted in saw collars and are shifted along the arbor by an electric setworks mounted on the top of the saw box and a shifting arm extending vertically between the setworks and a respective saw collar.

20 Claims, 5 Drawing Sheets

U.S. PATENT DOCUMENTS

| | | | |
|---|---|---|---|
| 1,111,331 A | 9/1914 | Tower | |
| 1,263,443 A | 4/1918 | Lien | |
| 1,985,500 A | 12/1934 | Horstkotte | |
| 2,149,235 A | 2/1939 | Stone | |
| 3,045,726 A | 7/1962 | Grogan | |
| 3,093,168 A | 6/1963 | Colt et al. | |
| 3,225,800 A | 12/1965 | Pease | |
| 3,240,243 A * | 3/1966 | Golick | 83/168 |
| 3,276,492 A | 10/1966 | Kervefors | |
| 3,285,302 A | 11/1966 | Thrasher | |
| 3,459,246 A | 8/1969 | Ottosson | |
| 3,580,305 A | 5/1971 | Wright | |
| 3,645,304 A | 2/1972 | Thrasher | |
| 3,736,968 A | 6/1973 | Mason | |
| 3,742,796 A | 7/1973 | McMillan | |
| 3,886,372 A | 5/1975 | Sanglert | |
| 3,890,509 A | 6/1975 | Maxey | |
| 3,960,041 A | 6/1976 | Warren et al. | |
| 3,963,938 A | 6/1976 | Sanglert | |
| 4,015,648 A | 4/1977 | Shepard | |
| 4,086,496 A | 4/1978 | Berry | |
| 4,127,044 A | 11/1978 | Kenyon | |
| 4,144,782 A | 3/1979 | Lindstrom | |
| 4,188,544 A | 2/1980 | Chasson | |
| 4,239,072 A | 12/1980 | Merilainen | 144/312 |
| 4,373,563 A | 2/1983 | Kenyon | |
| 4,383,561 A | 5/1983 | Gregoire et al. | |
| 4,440,203 A | 4/1984 | Ostberg | |
| 4,441,537 A | 4/1984 | Vartiainen | 144/357 |
| 4,449,557 A | 5/1984 | Makela | 144/357 |
| 4,475,422 A | 10/1984 | Lawson | |
| 4,485,861 A | 12/1984 | Nilsson et | |
| 4,548,247 A | 10/1985 | Eklund | |
| 4,572,256 A | 2/1986 | Rautio | |
| 4,583,576 A | 4/1986 | Rautio | |
| 4,599,929 A | 7/1986 | Dutina | |
| 4,633,924 A | 1/1987 | Hasenwinkle et al. | |
| 4,637,443 A | 1/1987 | Jansson | |
| 4,653,560 A | 3/1987 | Wislocker et al. | |
| 4,690,188 A | 9/1987 | Hasenwinkle | |
| 4,702,134 A | 10/1987 | Corley, III | |
| 4,711,279 A | 12/1987 | Reuter | |
| 4,879,659 A | 11/1989 | Bowlin et al. | |
| 4,881,584 A | 11/1989 | Wislocker et al. | |
| 4,941,100 A * | 7/1990 | McFarlane et al. | 700/167 |
| 4,947,909 A | 8/1990 | Stroud | |
| 5,143,127 A | 9/1992 | Rautio | |
| 5,148,847 A | 9/1992 | Knerr | |
| 5,215,071 A | 6/1993 | Mertes et al. | |
| 5,243,888 A | 9/1993 | Bowlin | |
| 5,320,153 A | 6/1994 | Knerr | |
| 5,396,938 A | 3/1995 | Cannaday | |
| 5,400,842 A | 3/1995 | Brisson | |
| 5,421,386 A | 6/1995 | Lundstrom | |
| 5,429,161 A | 7/1995 | Allard | |
| 5,435,361 A | 7/1995 | Knerr | |
| 5,469,904 A | 11/1995 | Kontiainen | |
| 5,722,474 A | 3/1998 | Raybon | 144/357 |
| 5,761,979 A * | 6/1998 | McGehee | 83/425.3 |
| 5,809,859 A | 9/1998 | Stroud et al. | |
| 5,816,302 A | 10/1998 | Newnes | 144/357 |
| 5,826,637 A | 10/1998 | Newnes | 144/382 |
| 5,853,038 A | 12/1998 | Newnes | |
| 5,870,936 A | 2/1999 | McGehee | |
| 5,884,682 A | 3/1999 | Kennedy | 144/357 |
| 5,921,162 A | 7/1999 | Jackson et al. | |
| 5,927,174 A | 7/1999 | Newnes et al. | |
| 5,946,995 A | 9/1999 | Michell | 83/425.3 |
| 5,960,104 A | 9/1999 | Conners et al. | |
| 5,992,484 A | 11/1999 | Jackson | |
| 6,039,097 A | 3/2000 | Kennedy et al. | |
| 6,039,098 A | 3/2000 | Kennedy | 144/357 |
| 6,062,280 A | 5/2000 | Newnes | 144/357 |
| 6,062,281 A * | 5/2000 | Dockter et al. | 144/357 |
| 6,178,858 B1 | 1/2001 | Knerr | 83/76.8 |
| 6,202,526 B1 | 3/2001 | Dockter | 83/76.8 |
| 6,520,228 B1 | 2/2003 | Kennedy et al. | |
| 6,612,216 B2 | 9/2003 | McGehee et al. | |

FOREIGN PATENT DOCUMENTS

| | | |
|---|---|---|
| CA | 937136 | 11/1973 |
| CA | 1036469 | 8/1978 |
| CA | 1036911 | 8/1978 |
| CA | 1039154 | 9/1978 |
| CA | 1051324 | 3/1979 |
| CA | 1114478 | 12/1981 |
| CA | 1146052 | 5/1983 |
| CA | 1218581 | 3/1987 |
| CA | 1272429 | 8/1990 |
| CA | 1279558 | 1/1991 |
| CA | 1281392 | 3/1991 |
| CA | 1301371 | 5/1992 |
| CA | 2034794 | 7/1992 |
| CA | 2091955 | 3/1994 |
| CA | 2131919 | 8/1994 |
| CA | 2009253 | 12/1994 |
| CA | 2123743 | 11/1995 |
| CA | 2022857 | 4/1996 |
| CA | 2109254 | 4/1997 |
| CA | 2205782 | 9/1997 |
| CA | 2395842 | 9/1997 |
| CA | 2202120 | 10/1997 |
| CA | 2214928 | 3/1998 |
| CA | 2193794 | 6/1998 |
| CA | 2216582 | 3/1999 |
| CA | 2188853 | 7/2000 |
| CA | 2192508 | 7/2000 |
| CA | 2200653 | 7/2000 |
| CA | 2202852 | 7/2000 |
| CA | 2201242 | 8/2000 |
| CA | 2338242 | 8/2001 |
| CA | 2309359 | 10/2001 |
| CA | 2229332 | 11/2001 |
| CA | 2134613 | 2/2002 |
| CA | 2316056 | 2/2002 |
| CA | 2198662 | 8/2002 |
| CA | 2415111 | 6/2003 |
| GB | 2068294 | 8/1981 |

OTHER PUBLICATIONS

CNC Programming Handbook, pp. 281-292, Author: Peter Smid, Published by Industrial Press Inc. in 2000.

Mastercam, Mill Version 5.5 User Guide, pp. 8-16 to 8-19, Author Unknown, Published by CNC Software Inc. in 1995.

* cited by examiner

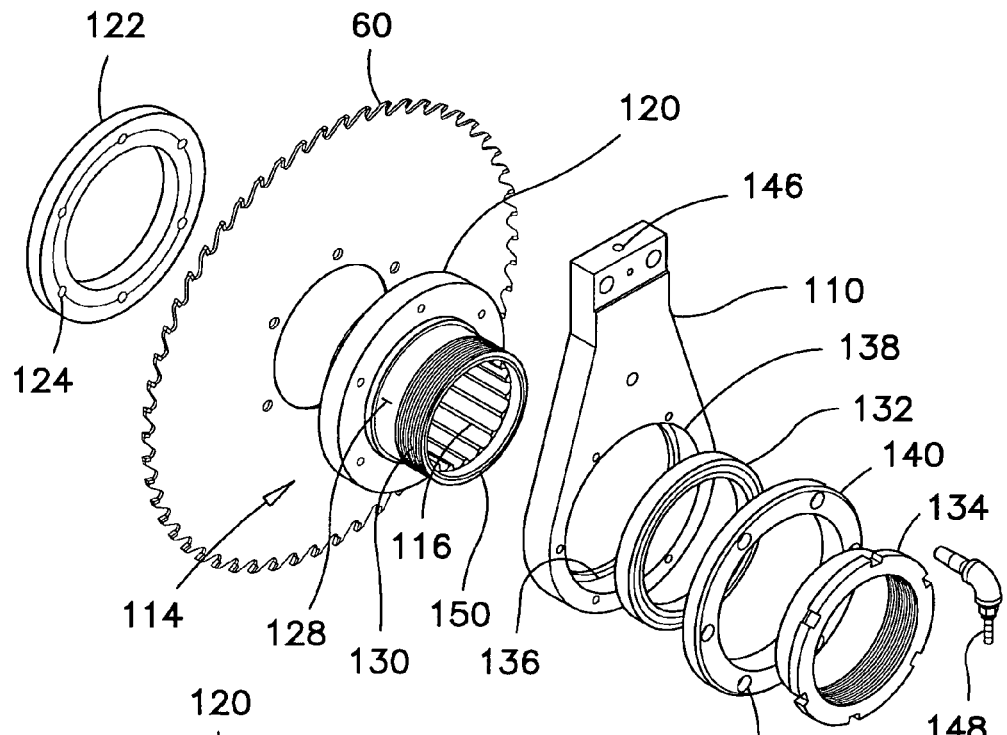
FIG. 8
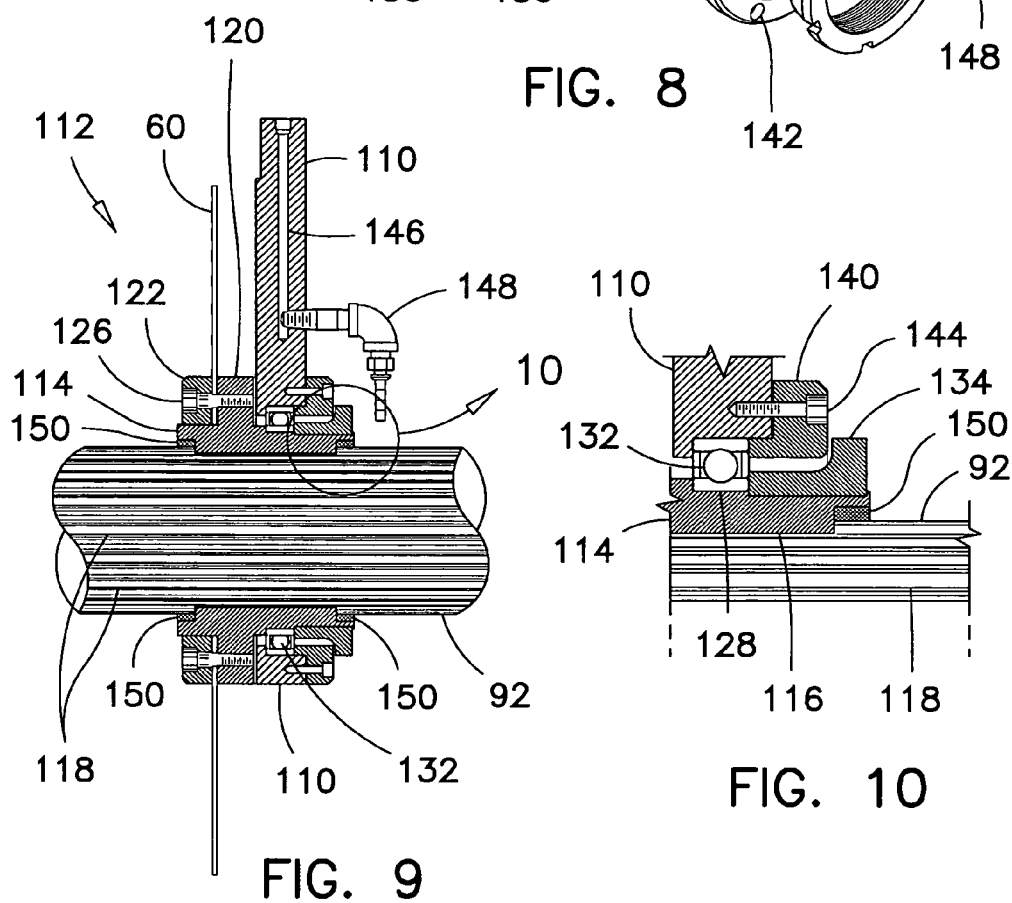
FIG. 9
FIG. 10

OPTIMIZED BOARD EDGER AND METHOD OF OPERATION THEREOF

This is a division of U.S. patent application Ser. No. 10/198,113 filed on Jul. 19, 2002, which is now U.S. Pat. No. 6,929,043.

FIELD OF THE INVENTION

This invention pertains to sawmill edgers and more particularly, it relates to a board edger having a movable saw box controlled by a scanner and a computer to maximize the recovery of lumber from wood cants.

BACKGROUND OF THE INVENTION

As the processing speed increases in sawmill machinery, wood pieces tend to bounce back from bumpers and alignment gates and are not always presented to the sawmill equipment in an ideal position. This inherent disadvantage with the handling of wood pieces is particularly apparent in wood cants or flitches. Wood cants have irregular and non-parallel sides which make them difficult to align along the longitudinal axis of an infeed conveyor for example. Consequently, increasing the processing speed of machinery often results in less recovery.

In the present description, the words; wood piece, cant, flitch and board are used interchangeably to designate a lengthwise strip of wood cut from a tree trunk.

In view of increasing both the processing speed and recovery, lineal scanners and computers have been developed to precisely measure the dimensions and the position of a wood board on a conveyor. These scanners and computers generate three-dimensional images of the cant, and calculate a sawing solution that represents the highest value combination of products which can be produced from the cant.

Similarly, sawmill edgers have been developed to operate with lineal scanners and computers. These edgers have a saw box that is adjustable about a vertical axis, and saw blades that are movable sideways along the arbor. The positions of the saw blades are continuously adjusted to track the realtime position and alignment of a wood board being fed there through and to follow the optimized cutting profile defined by the computer.

Examples of optimized edgers available in the prior art are disclosed in the following documents;

U.S. Pat. No. 4,239,072 issued Dec. 16, 1980 to H. Meriläinen;
U.S. Pat. No. 5,722,474 issued Mar. 3, 1998 to C. Raybon et al.;
U.S. Pat. No. 5,816,302 issued Oct. 6, 1998 to W. R. Newnes;
U.S. Pat. No. 5,884,682 issued Mar. 23, 1999 to J. B. Kennedy et al.;
U.S. Pat. No. 5,946,995 issued Sep. 7, 1999 to S. W. Michell et al.;
U.S. Pat. No. 6,178,858 issued Jan. 30, 2001 to M. P. Knerr et al.;
U.S. Pat. No. 6,202,526 issued Mar. 20, 2001 to M. Dockter et al.

It will be appreciated that in a continuous wood edging process, the cants to be trimmed must be located precisely such that the saw blades can track the optimized cut lines in one cant and reposition quickly to track the optimized cut lines in a next cant. It has been found, however, that when the leading edge of a saw blade is made to focus on the leading edge of a cant approaching at high speed, there is a certain amount of wandering of the saw blade before it is set to track the optimized cut line. The saw blade enters the leading edge of the cant in a milling mode rather than a sawing mode, thereby increasing the kerf width at the leading edge of the cant. Similarly, when the optimized cut line stops at the trailing edge of the cant, the saw blade stops tracking the optimized cut line before it has completely exited the cant, causing an aftercut and also increasing the kerf width at the trailing edge of the cant.

In the machines of the prior art, several methods are used to locate the leading and trailing edges of a cant to control the tracking of optimized cut lines. For example, the machine described in U.S. Pat. No. 4,239,072 uses several measuring gates on the infeed side of the cutter heads to determine the position of the cant relative to the cutter heads and to adjust the cutter heads prior to entering into the cant. The position of the cant is measured relative to a feeding line. The cutter heads are correspondingly positioned on both sides of the feeding line, and the tracking of the optimized cut lines starts as the cant passes through the edger. The cutter heads are inclined in relation to each other in such a manner that the cutter heads are closer to each other at their cutting side than at the exit side to prevent aftercut.

The machine disclosed in U.S. Pat. No. 5,722,474 uses photodetectors to detect the location of a cant relative to a reference point. Then the movement of the saw blades is correlated by computer with the longitudinal movement of the cant past the reference point.

The machine described in U.S. Pat. No. 5,884,682 uses another approach. The machine uses mechanical positioning devices to position the cant and to present it tangentially to the saw blades.

As it was explained, there are drawbacks in adjusting the saw blades to follow optimized cut lines which start at the leading edge of the wood board and end at the trailing edge of the board. As such, it may be appreciated that there continues to be a need for a new and improved method to operate a board edger to prevent these surface defects. There is also a need for a better board edger in which the saw blades are shifted with greater speed and precision.

SUMMARY OF THE INVENTION

In the present invention, however, there is provided an optimized board edger in which the structure of the saw blade moving mechanism has a low inertia, for rapid positioning of the saw blades. The saw box in the optimized board edger follows optimized cut lines on a virtual entity of the wood board to be trimmed. This virtual entity is made longer than the wood board such that the tracking of the optimized cut lines starts before the saw blades enter the leading edge of the wood board and ends after the saw blades have completely exited the wood board.

In the present disclosure, the expression "virtual entity" is used to describe a set of data inside a computer memory corresponding to the dimensions, position and speed of a wood board in motion relative to one or more space and time references that are assignable to a board edger.

Broadly, in accordance with a first feature of the present invention, there is provided a new method for edging a wood board. This method comprises the following steps:

a) providing a board edger having a movable saw box and a saw blade mounted in that saw box;
b) scanning a wood board and obtaining images of this wood board;
c) constructing from the images, a virtual entity of the wood board;

d) determining from the images, a position, alignment and travelling speed of the wood board;
e) determining from the images an optimized cut line along the virtual entity;
f) superimposing the virtual entity in space and time over the wood board;
g) displacing the forward edge of the virtual entity ahead of the leading edge of the wood board;
h) displacing the rear edge of the virtual entity behind the trailing edge of the wood board;
i) extending the optimized cut line to the forward and rear edges of the virtual entity;
j) simultaneously moving the virtual entity and the wood board through the board edger, and
k) sawing the wood board along the optimized cut line on the virtual entity.

The method according present invention for edging a wood board reduces the defects and disadvantages of the prior art by incorporating buffer zones ahead and after the wood board, in which the saw blade adjustments are effected. The lengths of these buffer zones are determined by the response time of the board edger for repositioning the saw blades, the desired speed of the transport conveyor and the desired spacing between the boards.

In accordance with another feature of the present invention, there is provided a board edger for edging wood cants, comprising a saw box having an arbour mounted therein. At least one saw collar assembly is adjustably mounted on the arbor and a saw blade is mounted in the saw collar assembly. The saw box also has a setworks mounted thereon above the arbor. The setworks has a displacement parallel to the arbor. A saw shifting arm extends at right angle from the arbor, between the saw collar assembly and the setworks for moving the saw blade along the arbor in response to a movement of the setworks. This saw shifting arrangement is advantageous over other board edgers of the prior art in that it is compact, light, frictionless and precise.

Other advantages and novel features of the present invention will become apparent from the following detailed description of the preferred embodiment.

BRIEF DESCRIPTION OF THE DRAWINGS

One embodiment of the present invention is illustrated in the accompanying drawings, in which like numerals denote like parts throughout the several views, and in which:

FIG. 8 is a perspective exploded view of a saw blade, a saw collar assembly and a saw shifting arm comprised in the saw box in the optimized board edger;

FIG. 9 is a cross-section view of the saw blade, the saw collar assembly and the shifting arm illustrated in FIG. 8;

FIG. 10 is an enlarged view of the saw collar assembly, and in particular of the portion of the hub as seen in detail circle 10 in FIG. 9.

DESCRIPTION OF THE PREFERRED EMBODIMENT

Figure 1:
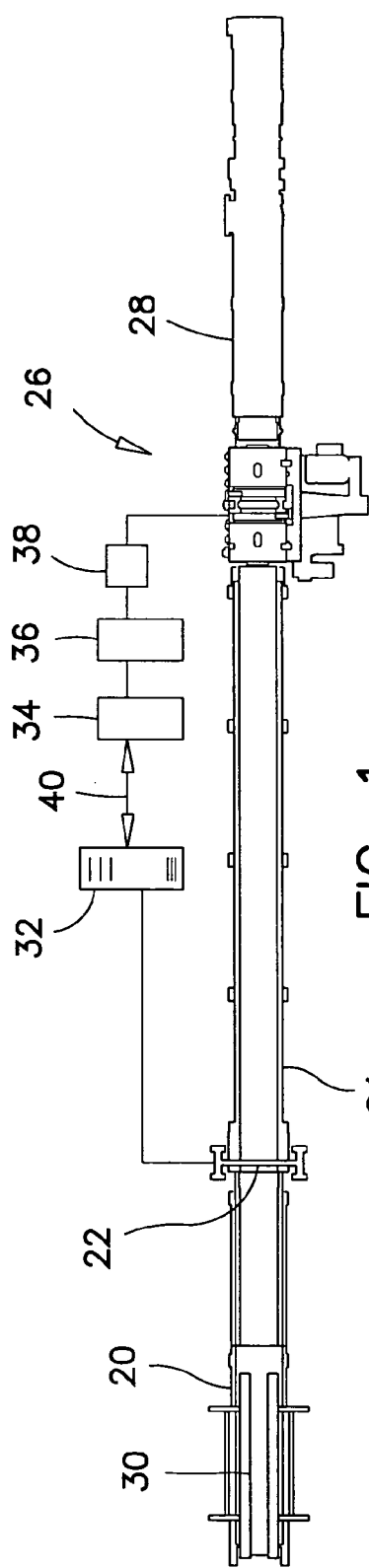
FIG. 1 is a plan view of a board edging installation comprising the optimized board edger according to the preferred embodiment of the present invention.
Figure 2:
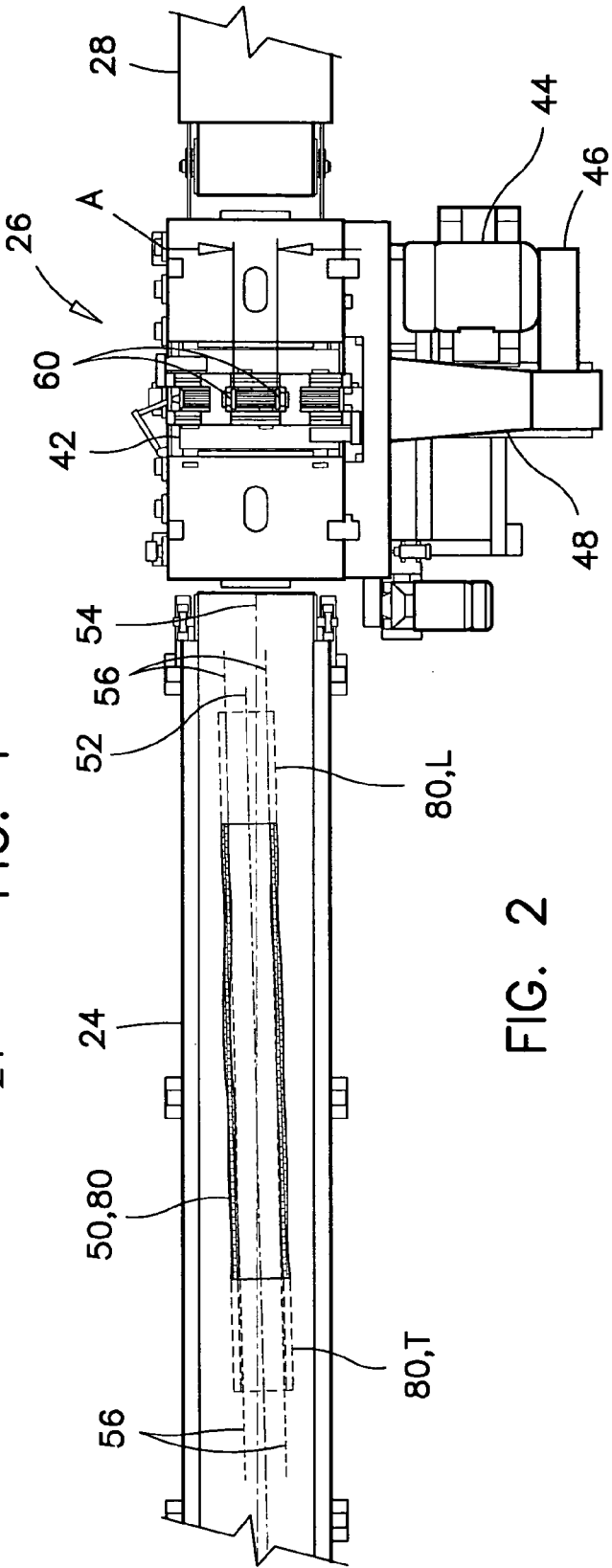
FIG. 2 is an enlarged plan view of the optimized board edger and partial views of the upstream transport conveyor and downstream discharge conveyor.

While this invention is susceptible of embodiments in many different forms, there is shown in the drawings and will be described in details herein one specific embodiment of the board edger according to the present invention, with the understanding that the present disclosure is to be considered as an example of the principles of the invention and is not intended to limit the invention to the embodiment illustrated and described. Similarly, the preferred installation of the optimized board edger and its method of operation are provided as examples to explain a general concept. These descriptions should not be used to limit the scope of the invention.

Referring firstly to FIGS. 1-4, a preferred method for operating an optimized board edger will be described. The preferred board edging installation comprises an in-line arrangement of an infeed conveyor 20, a lineal scanner 22, a transport conveyor 24, an optimized board edger 26, and a discharge conveyor 28. The preferred infeed conveyor 20 has a board pre-locating device 30 which function is to position each board as straight as possible along the transport conveyor 24. The infeed conveyor 20 can be fed manually or from a sorting table as it is customary in sawmills. Numerous components of the machines mentioned above and of the preferred optimized board edger are not illustrated herein because these components belong to known technology and do not constitute the focus of the present invention.

In the preferred board edging installation, a computer system is provided between the lineal scanner 22 and the optimized board edger 26. This computer system comprises a personal computer (PC) 32 containing an optimizing software, a programmable logic controller (PLC) 34 communicating with the PC 32 and with one or more servo modules 36 and one or more servo drive translators 38 to control the tracking functions of the optimized board edger 26. A two-way ethernet 100MB/sec. connection 40 is provided between the PC 32 and the PLC 34.

The lineal scanner 22 is preferably a 3-D True-Shape Scanner manufactured by Perceptron Inc., a company having its headquarters at Plymouth, Mich., USA. The PC 32 preferably has a high speed processor and optimizing software to receive a 3-D image from the lineal scanner 22 and to compute a breakdown solution in 250 millisecond or less for softwood applications and in 400 millisecond or less for hardwood applications.

The length of the transport conveyor 24 is determined according to the desired travel speed of this transport conveyor and the processing time for each sawing solution. A travel speed of 800-1200 feet/minute is believed achievable with the installation described herein.

The optimized board edger 26 according to the preferred embodiment has an active saw box 42 which is movable about a vertical axis and in which the saw blades are movable along the arbor. In order to reduce the inertia of the saw box 42, the arbor is driven by an electric motor 44 through sheaves and belts under the guard 46 and a flexible drive shaft under the guard 48.

In use, an untrimmed wood board 50 is scanned while in motion through the scanner 22. The longitudinal axis 52 of the board relative to the longitudinal axis 54 of the optimized board edger, as well as the optimized cut lines 56 are determined while the wood board is moving toward the optimized board edger 26.

The saws are set apart a same distance A as the spacing between the optimized cut lines 56. The saw box 42 is rotated to align the saw blades 60 parallel to the longitudinal axis 52 of the wood board, and the saw blades are set in motion along the arbor 62 to follow the optimized cut lines 56 as the wood board 50 travels through the optimized board edger 26.

Figure 3:
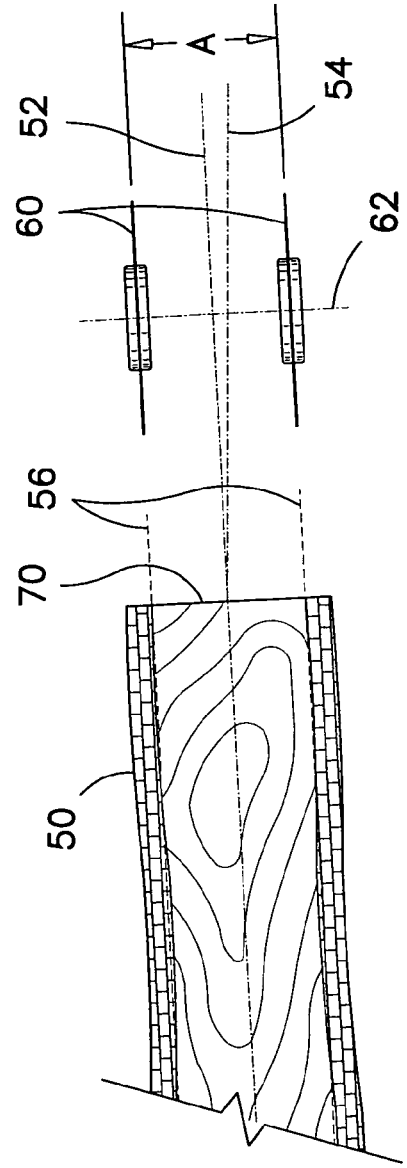
FIG. 3 is a partial plan view of a board or a cant entering the saws of an edger in a prior art installation.
Figure 4:
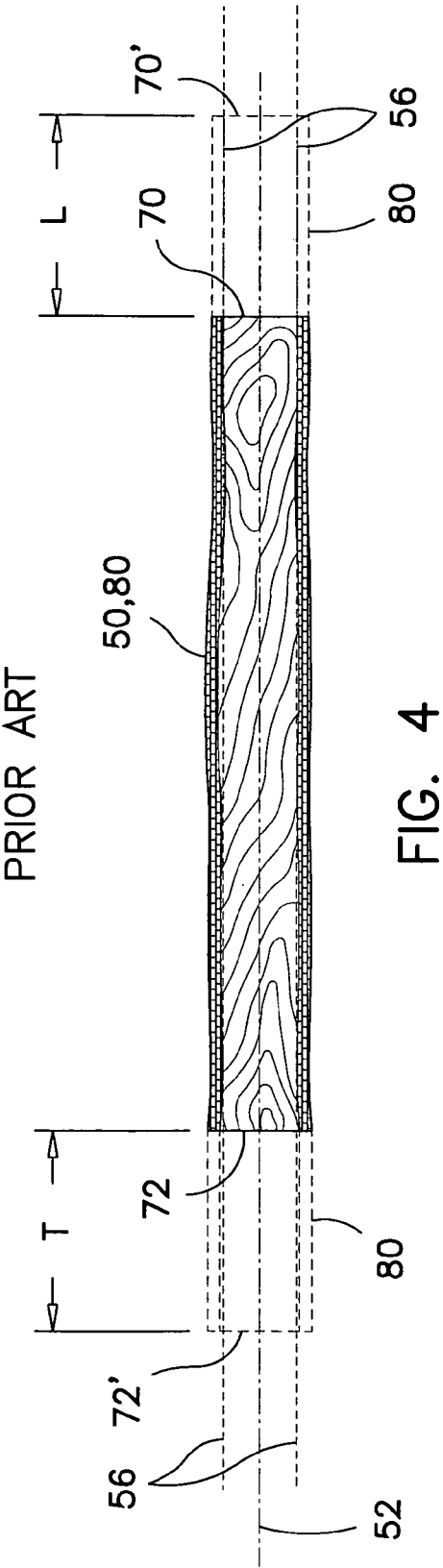
FIG. 4 is a plan view of a cant and of a virtual entity of this cant as generated by the computer system comprised in the preferred installation of the optimized board edger.

Referring now to FIG. 3, the problems with high speed positioning of a saw box will be described. When the longitudinal axis 52 of a wood board 50 to be trimmed is skewed a few degrees from the longitudinal axis 54, it will be appreciated that an initial adjustment to a proper spacing and alignment of the saw blades 60 must be made before the saw blades enter the wood piece.

In the machines of the prior art, the leading edge 70 and the rear edge 72 of the wood board 50 are detected and used to designate the beginning and the ending of the optimized cut lines 56. The leading and trailing edges are used as targets with which the saw blades must aim. However, it will be appreciated that the saw box has a certain inertia and its actuators have acceleration, deceleration, elasticity and dampening factors, incorporated in each of their movements. These motion factors cause a certain delay in positioning the saw blades 60 at the entrance and exit of a board. As a result, the positioning of the saw blades 60 is not instantaneous. The saw blades might still oscillate around their programmed position as they enter the leading edge 70 of the wood board. The tracking of the saw blades in unison to follow the optimized cut lines 56 may only start an instant after the saw blades have actually entered the board. Similarly, the movement of the saw blades in tracking the optimized cut lines throughout to the trailing edge 72 stops prematurely before the saw blades have completely exited the wood board.

This dragging in the positioning of the saw blades to follow the optimized cut lines causes the kerf width near the leading and trailing edges of a wood board to be generally larger than normal, causing defects in the recovered lumber and side stresses on the saw blades.

In the preferred method of operating the optimized board edger 26, the PC 32 is configured to construct a virtual entity 80 of each wood board 50. This virtual entity 80 has all the dimensions of the physical wood board 50. This virtual entity 80 is superimposed in space and time over the physical wood board 50.

Depending upon the operating speed and the length of the transport conveyor 24, the virtual entity 80 is assigned excess length L ahead of the leading edge 70 of the wood board 50, and excess length T following the trailing edge 72 of the wood board 50. The optimized cut lines 56 are projected along both excess lengths L, T.

In the preferred method of operation, the angle of the saws 60 relative to the longitudinal axis 52 of the wood board 50 and the spacing A of the saw blades 60 are adjusted, and the displacement of the saw blades in unison along the arbour 32 is set in motion by the PC 32 according to the position, alignment and travelling speed of the virtual entity 80. The target set points between which precise tracking of the saw blades 60 is maintained are set at the forward edge 70' and the rear edge 72' of the virtual entity 80. By aiming the saw blades 60 at the forward edge 70' of the virtual entity 80, the inherent oscillation of the saw blades 60 during positioning occurs along the excess length L, such that uniform side edges are obtained from the leading edge 70 of the actual wood board 50. Similarly, the tracking of the optimized cut lines back to the rear edge 72' of the virtual entity 80 ensures that the saw blades are out of the wood board 50 when tracking stops. In the preferred edging installation, having the response and computing time as mentioned hereinbefore, the lengths L and T are set at 24 inch each.

Figure 5:
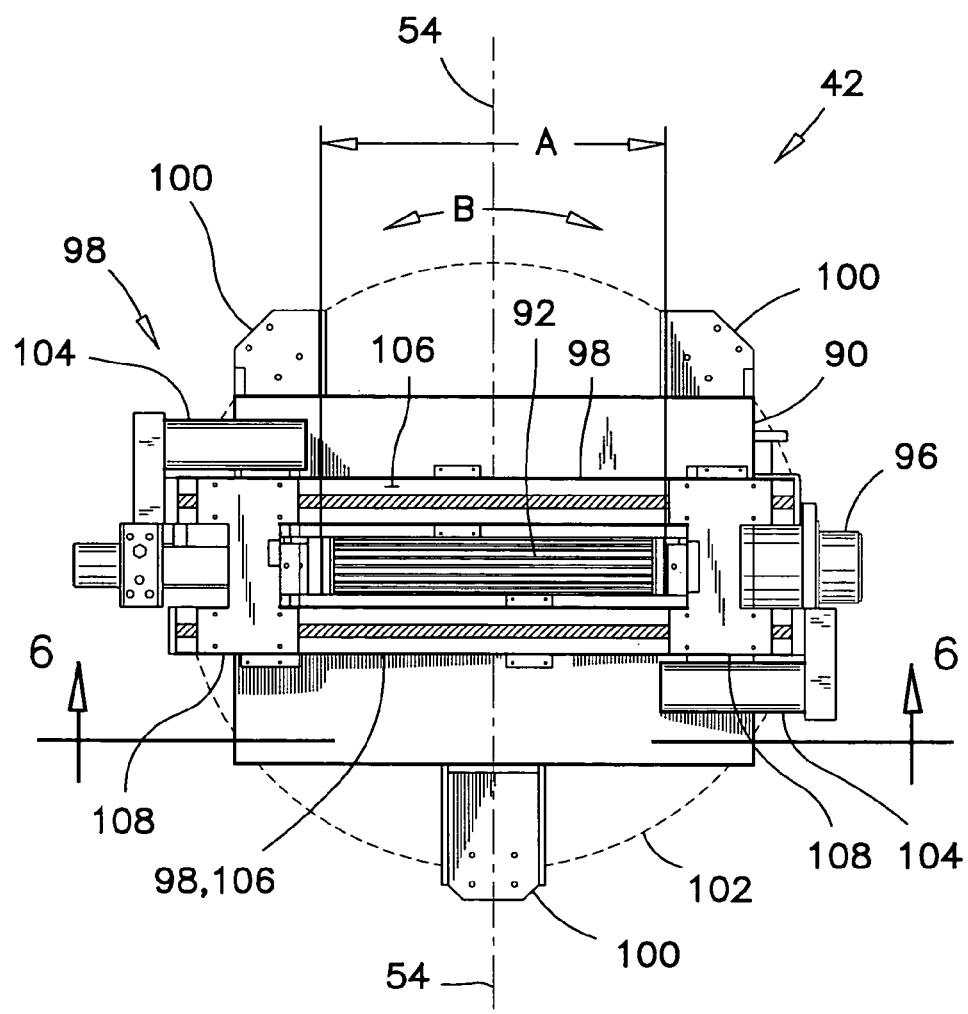
FIG. 5 is a plan view of the saw box in the optimized board edger according to the preferred embodiment.
Figure 6:
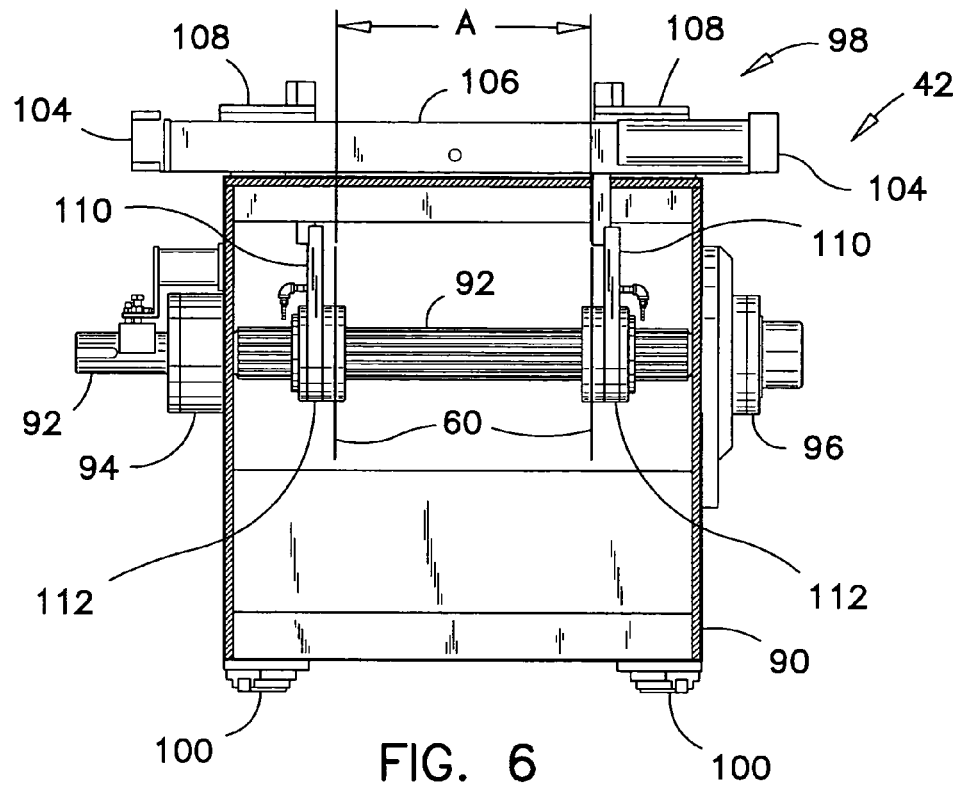
FIG. 6 is a cross-section view of the saw box, as seen along line 6-6 in FIG. 5.
Figure 7:
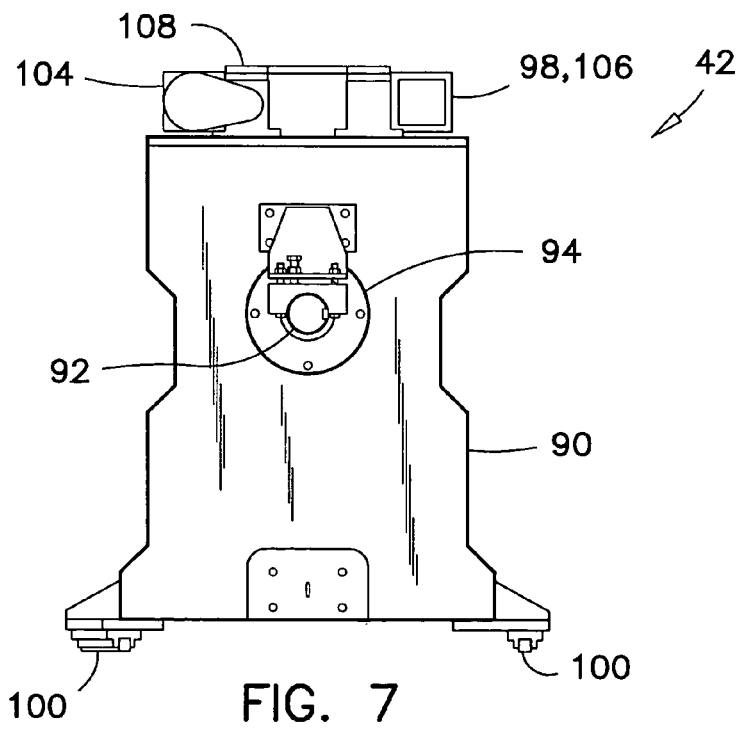
FIG. 7 is a side view of the saw box in the optimized board edger.

Referring now to FIGS. 5-7, the saw box 42 in the preferred optimized edger 26 will be described in some details. The saw box consists of a frame 90, an arbor 92 mounted in bearings 94, 96, a pair of saw blades 60 mounted on the arbor 92. The saw box has a setworks 98 mounted on top of the frame 90. There is provided three circular ball bearings 100 on the bottom of the frame 90. The bearings 100 are set on a circular rail 102, represented by a dashed line in FIG. 5. This circular rail is mounted on the base of the edger 26. The preferred angular adjustment B of the saw box 42 is 7-½° to the left and to the right of the longitudinal axis 54 of the optimized board edger 26, for a total angular displacement of 15°.

The rotation of the saw box 42 to the right or the left of the longitudinal axis 54 is effected by a DC servo drive actuator controlled by the PC 32. This DC servo drive actuator and its mounting have not been illustrated herein for being known to those skilled in the art.

The setworks 98 also comprises two DC servo drive motors 104 respectively linked to a linear slide 106, and also being controlled by the PC 32. Each linear slide 106 encloses a ball screw and a ball nut connected to a yoke plate 108. Each DC servo drive motor 104 drives the yoke plate 108 along the linear slide 106 with precision. A shifting arm 110 is affixed to the yoke plate 108 and extends to a respective saw collar assembly 112 for moving one of the saw blades 60 along the arbor 92. Both saw blades 60 are movable independently of each other along the arbor 92 for board width adjustment, and in unison with each other during the edging of a wood board.

The arbor 92 has splines thereon as it is customary with board edgers. Each saw blade 60 is supported in a collar assembly 112, which is adapted to engage with, and to slide along these splines. This collar assembly 112 is better illustrated in FIGS. 8-10. The saw collar assembly 112 comprises a hub 114 which has grooves 116 therein to engage with the splines 118 on the arbor 92, with a loose sliding fit. The hub 114 has a flange 120 on its circumference, to which is clamped the saw blade 60, by means of a blade lock ring 122 with bolt holes 124 and machine screws 126 through these holes. Next to the flange 120, there is an inner bearing seat 128 on the outside surface of the hub, and an adjoining threaded portion 130. A bearing 132 is held to the inner bearing seat 128 of the hub by a lock nut 134 engaged over the threaded portion 130. This bearing 132 affords a frictionless rotation of the hub 114 relative to the shifting arm 110.

The outer race of the bearing 132 is clamped into an outer bearing seat 136 inside an opening 138 in the lower end of the shifting arm 110. The outer race of the bearing 132 is held to the outer bearing seat 136 by means of an outer lock ring 140 having bolt holes 142 and machine screws 144 through these holes. Where possible, the components of the saw collar assembly 112 are made of aluminum to ensure a minimum weight and inertia.

The preferred shifting arm 110 has a conduit 146 therein to which is connected a nozzle 148. This conduit 146 and nozzle 148 are advantageous for periodically pumping lubricant to the surface of the arbor 92 for lubricating the hub 114 and the arbor 92.

Referring particularly to FIG. 10, the grooves 116 inside the hub 114 do not extend the full length of the hub. A brass ring 150 is mounted on each end of the hub 114, inside the hub, and both rings 150 complement with the grooves, the full length of the hub. Each brass ring 150 is press fitted into a shoulder at each end of the hub 114. The inside diameter of each ring 150 is a loose fit over the crest of the splines 118 on the arbor 92. The brass rings 150 are advantageous for preventing a binding of the grooves 116 into the splines 118 and facilitate to a considerable extent the movement of the collar assembly 112 along the arbor 92.

As to other manner of usage and operation of the present invention, the same should be apparent from the above description and accompanying drawings, and accordingly further discussion relative to the manner of usage and operation of the invention would be considered repetitious and is not provided.

While one embodiment of the present invention has been illustrated and described herein, it will be appreciate d by those skilled in the art that various modifications, alternate constructions and equivalents may be employed without departing from the true spirit and scope of the invention. Therefore, the above description and the illustrations should not be construed as limiting the scope of the invention which is defined by the appended claims.

We claim:

1. A board edger comprising;
   a base having a board mover for conveying boards in a flow path; and
   a saw box movably coupled to the base, said saw box comprising;
   a frame;
   an arbor mounted horizontally within the frame;
   at least one saw collar assembly slideably mounted on said arbor, the saw collar assembly comprising a saw blade mounted in said saw collar assembly, wherein the position of the saw collar assembly is adjustable along the arbor;
   a setworks movably coupled to the frame and having a displacement parallel to said arbor; and
   an arm extending from said arbor between said saw collar assembly and said setworks, the arm adapted for moving said saw collar assembly horizontally along said arbor in response to a movement of said setworks.

2. The board edger as claimed in claim 1, wherein the position of the saw box is angularly adjustable about a vertical axis of the saw box, wherein said vertical axis of the saw box is generally transverse to the board flow path.

3. The board edger as claimed in claim 1, wherein said saw collar assembly comprises a hub having grooves therein movably engaged with splines on said arbor.

4. The board edger as claimed in claim 3, wherein said hub further comprises a brass ring contiguous with said grooves, and said brass ring has a sliding fit dimension over a crest portion of said splines.

5. The board edger as claimed in claim 1, wherein said setworks comprises a DC servo motor that drives a yoke plate coupled to said shifting arm via a ball screw and ball nut coupled to the yoke plate.

6. The board edger as claimed in claim 1 wherein said shifting arm has a conduit therein and a nozzle connected to said conduit.

7. The board edger as claimed in claim 3, further comprising a bearing disposed between said shifting arm and said hub to allow rotation of the hub relative to the shifting arm.

8. The board edger as claimed in claim 7, wherein said collar assembly comprises a flange on said hub and a lock ring with bolt holes therein for clamping said saw blade to said flange.

9. The board edger as claimed in claim 8, wherein said hub further comprises an inner bearing seat and a lock nut threaded thereon for clamping a bearing inner race to said bearing seat.

10. The board edger as claimed in claim 9, wherein said shifting arm has an outer bearing seat.

11. The board edger as claimed in claim 10, wherein said collar assembly comprises an outer lock ring having means for clamping a bearing outer race to said outer bearing seat.

12. The board edger as claimed in claim 2, wherein said saw box is angularly adjustable about said vertical axis over an angle of about 15 degrees.

13. The board edger as claimed in claim 11, wherein said collar assembly and said shifting arm are made of a material belonging to the group composed of aluminum alloys and aluminum.

14. An apparatus for edging wood cants comprising:
    a computing system, the computing system comprising
    a scanner, and
    a computer coupled to the scanner,
    the computer system further comprising operating logic to generate
    a first optimized cut pattern with an optimal cut line for a wood cant,
    a virtual entity of the wood cant, the virtual entity being longer than the wood cant, and
    a second cut pattern based on the virtual entity, wherein the second cut pattern extends the length of the optimal cut line; and
    a board edger, the board edger comprising:
    a base, the base comprising a support for conveying boards in a flow path, and
    a saw box movably coupled to the base, the saw box including:
    a frame,
    an arbor mounted generally horizontally within the frame,
    at least one saw collar assembly slideably mounted on said arbors,
    a saw blade mounted to said saw collar assembly,
    a setworks coupled to the computing system and movably coupled to the frame, the setworks having a displacement parallel to said arbor, the displacement being effected by the computing system according to the second cut pattern, and
    a saw shifting arm extending from said arbor between said saw collar assembly and said setworks, the saw shifting arm for moving said saw collar assembly in conjunction with said saw blade along said arbor in response to a movement of said setworks,
    wherein the saw box is angularly adjustable about a vertical axis of the saw box to allow the saw blade to track the optimized cutting line of the second cut pattern prior to the saw blade engaging the board along the optimized cutting line.

15. The apparatus of claim 14, wherein the saw box further causes the saw blade to cut along the optimized cutting line of the second cut pattern after the saw blade has exited the board.

16. The apparatus as claimed in claim 1, further comprising bearings mounted to the frame, wherein the arbor is mounted in the bearings.

17. The apparatus as claimed in claim 16, wherein the bearings are configured to restrict lateral movement of the arbor.

18. The apparatus as claimed in claim 1, wherein said at least one saw collar assembly comprises a plurality of saw collar assemblies adjustably mounted on said arbor and a saw blade mounted in each of said plurality of saw collar assemblies.

19. The apparatus of claim 14, further comprising bearings mounted to the frame, wherein the arbor is mounted in the bearings, and wherein the bearings are configured to restrict lateral movement of the arbor.

20. The apparatus of claim 14, wherein said at least one saw collar assembly comprises a plurality of saw collar assemblies adjustably mounted on said arbor and a saw blade mounted to each of said plurality of saw collar assemblies.

* * * * *

UNITED STATES PATENT AND TRADEMARK OFFICE
CERTIFICATE OF CORRECTION

| | | |
|---|---|---|
| PATENT NO. | : 7,571,751 B2 | Page 1 of 1 |
| APPLICATION NO. | : 11/012217 | |
| DATED | : August 11, 2009 | |
| INVENTOR(S) | : Woodford et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 544 days.

Signed and Sealed this

Seventh Day of September, 2010

David J. Kappos
*Director of the United States Patent and Trademark Office*

UNITED STATES PATENT AND TRADEMARK OFFICE
CERTIFICATE OF CORRECTION

PATENT NO.         : 7,571,751 B2                                        Page 1 of 1
APPLICATION NO.    : 11/012217
DATED              : August 11, 2009
INVENTOR(S)        : James D. Woodford et al.

It is certified that error appears in the above-identified patent and that said Letters Patent is hereby corrected as shown below:

Column 8

Line 40, "...said arbors, ..." should read --...said arbor, ...--.

Line 66, "...The apparatus as claimed in claim 1..." should read --...The board edger as claimed in claim 1...--.

Signed and Sealed this

Twenty-first Day of December, 2010

David J. Kappos
*Director of the United States Patent and Trademark Office*